(12) United States Patent
Gärtner et al.

(10) Patent No.: US 9,726,301 B2
(45) Date of Patent: Aug. 8, 2017

(54) DEVICE WITH ROTARY VALVE FOR THE MANIPULATION OF LIQUIDS

(71) Applicant: MICROFLUIDIC CHIPSHOP GMBH, Jena (DE)

(72) Inventors: Claudia Gärtner, Jena (DE); Heiko Böttcher, Zöllnitz bei Jena (DE); Richard Klemm, Kahla (DE)

(73) Assignee: MICROFLUIDIC CHIPSHOP GMBH, Jena (DE)

( * ) Notice: Subject to any disclaimer, the term of this patent is extended or adjusted under 35 U.S.C. 154(b) by 27 days.

(21) Appl. No.: 14/383,271

(22) PCT Filed: Mar. 11, 2013

(86) PCT No.: PCT/EP2013/054903
§ 371 (c)(1),
(2) Date: Sep. 5, 2014

(87) PCT Pub. No.: WO2013/135640
PCT Pub. Date: Sep. 19, 2013

(65) Prior Publication Data
US 2015/0020904 A1    Jan. 22, 2015

(30) Foreign Application Priority Data

Mar. 10, 2012  (DE) .................. 10 2012 005 270

(51) Int. Cl.
| | |
|---|---|
| F16K 99/00 | (2006.01) |
| B01L 3/00 | (2006.01) |
| F16K 5/04 | (2006.01) |
| F16K 11/085 | (2006.01) |
| F16K 31/60 | (2006.01) |

(52) U.S. Cl.
CPC .... *F16K 99/0013* (2013.01); *B01L 3/502738* (2013.01); *F16K 5/04* (2013.01); *F16K 11/085* (2013.01); *F16K 31/60* (2013.01); *F16K 99/0028* (2013.01); *B01L 2400/0622* (2013.01); *B01L 2400/0644* (2013.01); *F16K 99/00* (2013.01); *F16K 2099/0084* (2013.01); *Y10T 137/86863* (2015.04)

(58) Field of Classification Search
CPC .......... F16K 99/00; F16K 11/085; F16K 5/04; F16K 31/60; F16K 99/0028; B01L 3/502738; B01L 2400/0644; B01L 2400/0622; Y10T 137/86863
USPC ..................................... 137/625.46; 251/157
See application file for complete search history.

(56) References Cited

U.S. PATENT DOCUMENTS

| | | | | |
|---|---|---|---|---|
| 2,926,698 | A | * 3/1960 | Whitlock, Jr. | ........ F16K 11/085 137/625.29 |
| 4,068,528 | A | 1/1978 | Gundelfinger | |
| 4,506,558 | A | * 3/1985 | Bakalyar | ................ G01N 30/20 73/863.72 |
| 4,625,569 | A | 12/1986 | Toei et al. | |

(Continued)

*Primary Examiner* — Michael R Reid
*Assistant Examiner* — Christopher Ballman
(74) *Attorney, Agent, or Firm* — Jason D. Voight

(57) ABSTRACT

The present invention describes a device consisting of a rotor, a holding-down device, and a base plate. The base plate is normally a fluidic system, a planar fluidic system for example or a fluidic system with several fluidic ports for a directed guidance of liquids or gases through different channels, channel systems, cavities or tubing, for the combination liquid and gas streams, or for prevention of liquid flows.

20 Claims, 6 Drawing Sheets

(56) References Cited

U.S. PATENT DOCUMENTS

Figure 1:
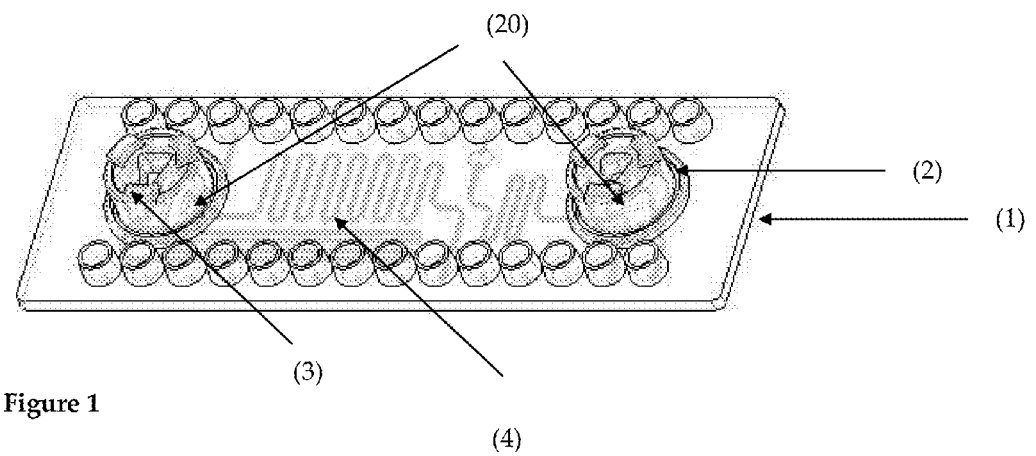

| | | | |
|---|---|---|---|
| 6,672,336 B2 * | 1/2004 | Nichols | F16K 11/074 137/625.11 |
| 7,503,203 B2 * | 3/2009 | Gamache | F16K 11/074 137/51 |
| 8,104,506 B2 * | 1/2012 | Gamache | F16K 7/12 137/597 |
| 8,186,381 B2 * | 5/2012 | Wilen | F16K 11/074 137/580 |
| 2003/0116206 A1 | 6/2003 | Hartshorne et al. | |
| 2007/0144594 A1 * | 6/2007 | Moon | F16K 11/074 137/625.46 |
| 2011/0104024 A1 | 5/2011 | Gransee et al. | |
| 2011/0203678 A1 | 8/2011 | Servin | |
| 2011/0297866 A1 | 12/2011 | Weber | |
| 2012/0160355 A1 | 6/2012 | Dahlke et al. | |

\* cited by examiner

DEVICE WITH ROTARY VALVE FOR THE MANIPULATION OF LIQUIDS

This is the national stage of International Application PCT/EP2013/054903, filed Mar. 11, 2013.

STATE OF THE TECHNOLOGY

It is the task of planar fluidic systems, e.g. so-called lab-on-a-chip or microfluidic systems, to move liquids through different cavities, channels or other fluid-containing elements such as tubing in a directed manner, to prevent a flow of liquids, or to separate compartments, respectively.

To cope with this task, turning valves were integrated into so-called lab-on-a-chip systems. Hereto various approaches have been proposed. One embodiment shows rotors with fluidic structures which can be pressed down by a spring being part of a housing that is screwed onto the chip. This approach aims at leak tightness (Gärtner et al: Smart-HEALTH: a microfluidic multisensor platform for POC cancer diagnostics, Proc. SPIE 7313, 73130B, Orlando, (2009)). On the other hand, reports exist, where the rotor is inserted into the chip and the valve is pressed down by the controlling instrument for the lab-on-a-chip system after its insertion into the instrument. This leads to a fluidically tight sealing (DE 10 2009 027 352 A1).

These concepts for turning valves borrow the principle of liquid guidance from valves of the company Rheodyne for chromatographic applications (U.S. Pat. No. 4,068,528, date of patent application: 13 Apr. 1976). Here, moveable elements with slits are utilized for the control and metering of liquids. It is a standard component for numerous chromatographic applications.

The goals for valves in fluidic systems such as microfluidic systems are two-fold. On one hand the tightness of the valve being part of the entirely produced chip has to be guaranteed in order to allow for a pre-filling of the system prior to insertion of the chip into the control device. On the other hand, most of the fluidic systems, especially microfluidic systems for diagnostics, are used as disposables being used in price-sensitive markets leading to the need to keep the costs of goods as low as possible.

Due to their basic design, the valves of the company Rheodyne and succeeding products cannot be integrated into planar fluidic systems. The slit elements used are inserted into housings which generate a compression sealing using the applied system pressures. In addition, the systems cannot be produced in a cost-saving manner and are thus positioned in a high-priced non-disposable market segment.

The option to seal the rotor after insertion of the disposable microfluidic system into the controlling device by pressure admission cannot be realized in practice as requirements for a flexible application such as filling with reagents outside of the controlling instrument cannot be met. In case of the invention described by patent DE 10 2009 027 352 A1, the rotor element is placed within a jacket. This technical solution is faced with contradicting requirements. To ensure leak-free operation, the rotor has to sit tightly in the jacket, however for its actuation, it has to rotate smoothly without any tilting at low actuation forces. These arguments speak against a broad application of said invention and describe its shortcomings.

In relation to functional aspects, turning valves consisting of rotor, screws, housing, and springs offer an option to guarantee the tightness of valves and the fluidic system directly after the production of the fluidic system. Due to the cost of goods, however, this concept fails. The number of individual parts, which have to be realized, is too high, representing already a considerable cost factor and give rise to a complex assembly process unsuitable for a disposable device.

DESCRIPTION

The present invention describes a turning valve consisting of a rotor, a holding-down component, and a structured base plate, in order to preferentially guide as well as to meter liquids or gases through planar fluidic systems or to interrupt liquid flows in a controlled manner. The base plate represents in most embodiments the fluidic system in which the fluids will be manipulated.

An exemplary setting is a fluidic system such as a lab-on-a-chip system, onto which the rotor is placed and pressed onto the fluidic system by the holding-down component, as outlined in FIG. 1. In the case of this embodiment, the base plate (1) is concurrently the fluidic system. In this embodiment said base plate contains channel or chamber structures to guide fluids. These structures are fluidically connected to the bottom side of the rotor (3) via junctions at the contact area of the base plate. In addition, the bottom side of the rotor itself carries fluidic structures (20), which can be used for a targeted connection of the different junctions on the base plate to the rotor. The contact area (32) between rotor and base plate acting as a seat for the rotor holds the fluidic contacts of the base plate. This is highlighted in FIG. 17 in a cross section of an embodiment of the holding-down device.

The fluidic structures of the rotor are able to connect as well as disconnect channels and cavities inside the base plate, which have fluidic contact to the rotor via junctions in the contact area. The holding-down device (2) will be tightly connected to the fluidic system—in a way that an initial hold-down force will be applied on the rotor by this holding-down device. This results in a permanent tightness of the valve. In the shown example, the structures (20) inside the bottom side of the rotor interconnect the fluidic structures of the base plate in order to selectively interconnect channel ends and to selectively charge or discharge liquids.

Figure 2:
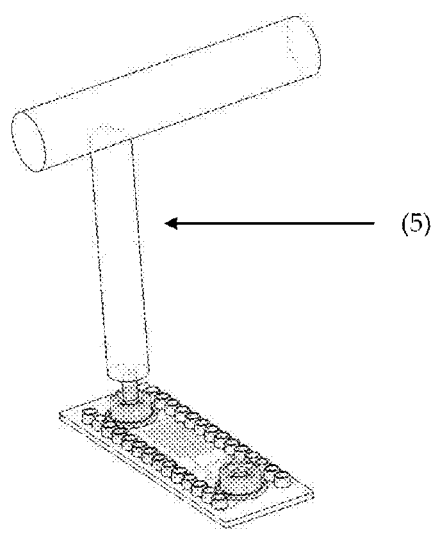

FIG. 2 depicts exemplarily how a counterpart subsequently labelled as "actuator" of the turning valve (5), which can be a simple tool being manually operated or a component of the controlling device, couples to the rotor through an opening (5) of the holding-down device, which is supplied by a cap in this case, and facilitates a motion of the rotor (3).

Figure 3:
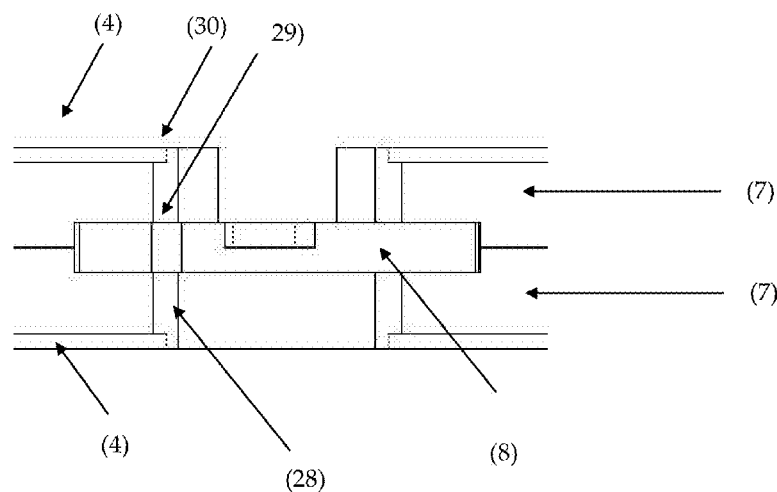

An additional embodiment of the invention is shown in FIG. 3. Here, two plates (7) are interconnected and the rotor is realized as a thin valve disc (8) being embedded between the plates, which also provide for the required initial clamping force. Both plates act as a fluidic system and can contact each other fluidically. The figure exemplifies how the channel structures of one fluidic system (28) are connected with the fluidic structures of the second plate (30) through openings (28). In this case, the openings are represented by through-holes shaped fluidic structures (29) of the rotor that are in contact to openings (30) of the second plate, which also end in fluidic structures such as channels (4).

Figure 4:
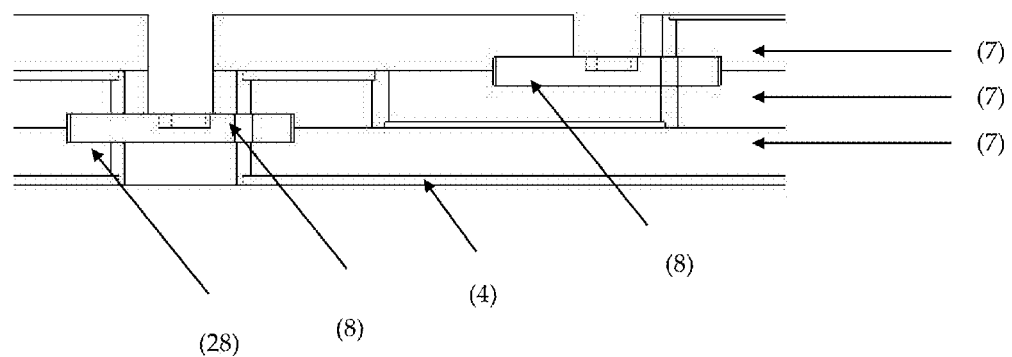

FIG. 4 provides an additional embodiment of the invention. Here, more than two plates (7) generate a fluidic system. The disc-shaped rotors of the valve can be embedded on different levels.

Figure 5:
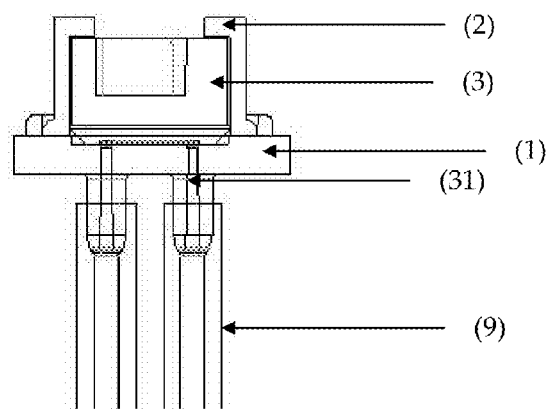

FIG. 5 illustrates a variant, where a rotor (3) and a holding-down device (2) are placed on a base plate. Tubing (9), capillaries or similar fluid-carrying elements can be connected to other components with this tool. This embodiment displays fluid interfaces of the base plate (31) which can be used for the connection with tubing.

The elements of the described invention are the rotor, the holding-down device as well as the base plate being shaped as a planar fluidic system in most cases. Different embodiments of the individual modules are however possible.

Figure 6:
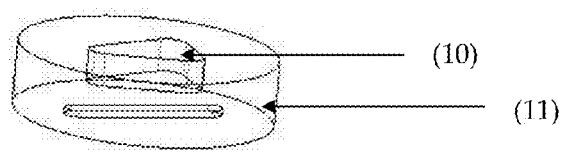
Figure 7:
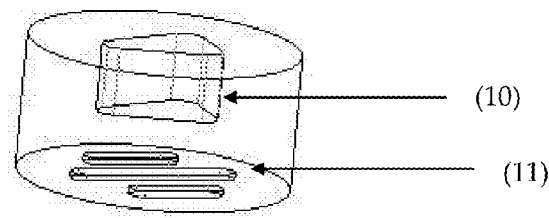
Figure 8:
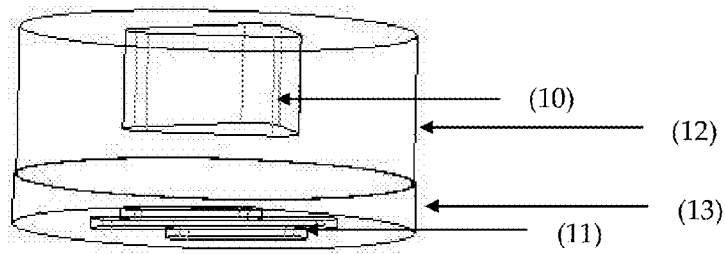

The rotor can be shaped as a thin disc, as shown in FIG. 6, or as a higher structure, as shown in FIG. 7, with integrated channels or other fluidic functions (11). For simplicity in manufacturing, the rotor consists preferentially of polymer materials. Materials with good sealing properties and low slip effect are advantageous in order to facilitate a simple rotary motion without distortion of structures located inside the rotor. The rotor can either be composed completely out the appropriate material, can carry a thin coating, or can be assembled out of a hard and a soft, sealing component. FIG. 8 shows the embodiment where the rotor is composed of two different materials. Here, the first material (12) forms the upper part of the rotor with which for instance the actuator of the turning valve makes contact. The second material (13) acts as the bottom part of the rotor providing the contact to the base plate. Independent of the embodiments of the rotor, structures (10) are integrated on the side being termed "top side" in the following which serve as counter structures for a tool (actuator of a turning valve, (5)). The bottom side contains fluid structures (11), which serve as a switch for liquids or gases.

Figure 9:
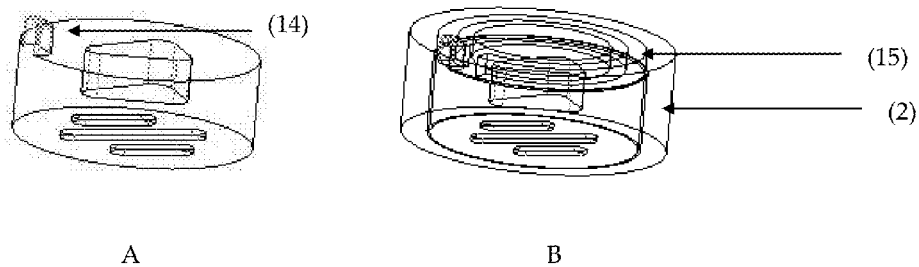
Figure 10:
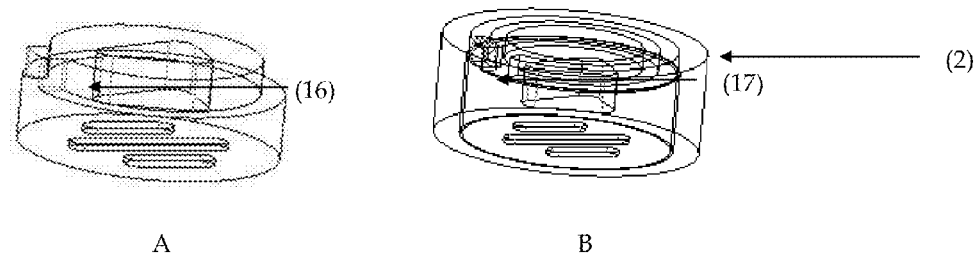
Figure 11:
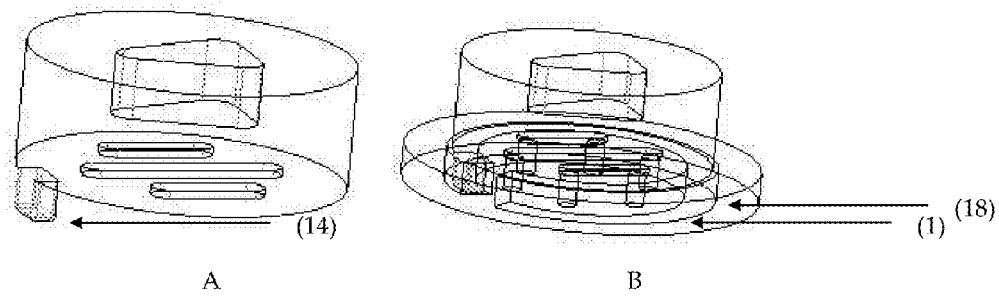
Figure 12:
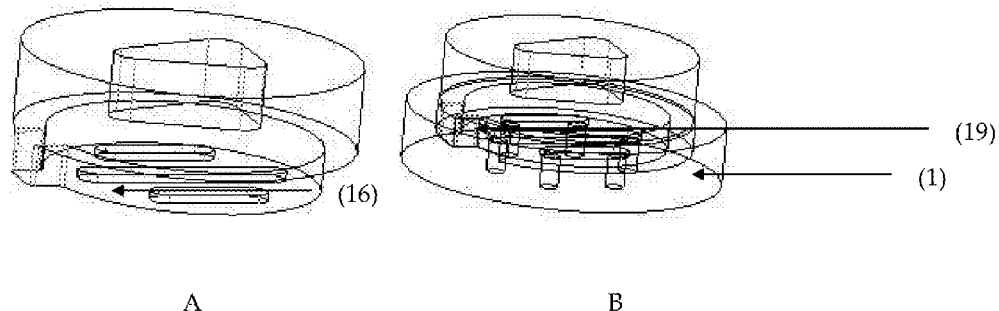

Structural elements protruding from the plane of the top side and a corresponding indentation on the counterpart allow for a specific rotation of the rotor and for a determination of the precise position through a mechanical stop. In this case, different embodiments can be realized. FIG. 9 displays an embodiment with a protrusion on the top side of the rotor (14) in part A of the figure and a guide-structure with locking element (15) in the holding-down device in part B of the figure, which shows an assembly of rotor and holding-down device. In FIG. 10 the guide-structure is located inside the holding-down device, part A of the figure, and the protrusion inside the holding-down device (17), part B of the figure. FIG. 11 displays the variant with the protrusion (14) in the bottom side of the rotor, figure part A, and the guide-structure in the base plate, part B of the figure. Guide-structures in the bottom side of the rotor and protrusion in the mounting plate are an additional embodiment, as shown in FIG. 12.

Figure 13:
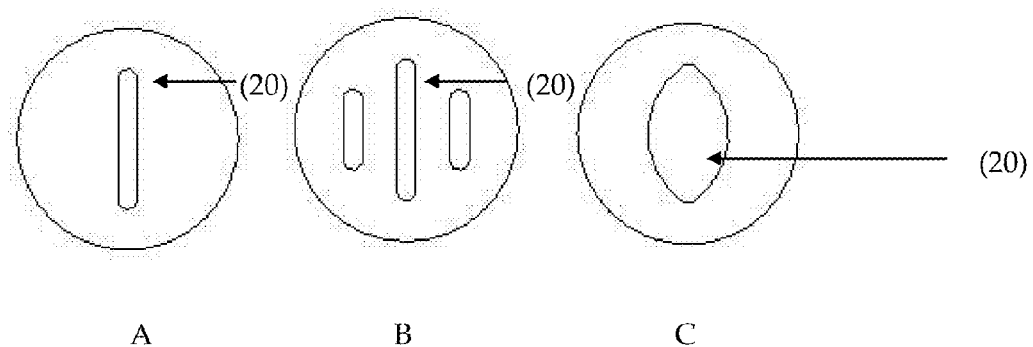

FIG. 13 displays embodiments of fluidic structures (20) which can be implemented in the bottom side of the rotor for the connection of channels or the metering of volumes.

Figure 14:
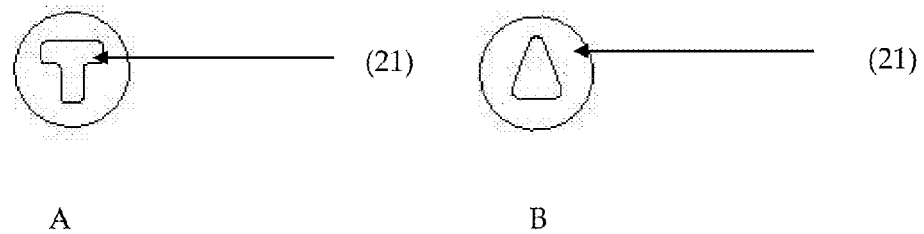

FIG. 14 offers options for a counter structure (21) for the actuator of the turning valve, in order to place this structure in or on the rotor and, thereby, to facilitate a rotation.

Figure 15:
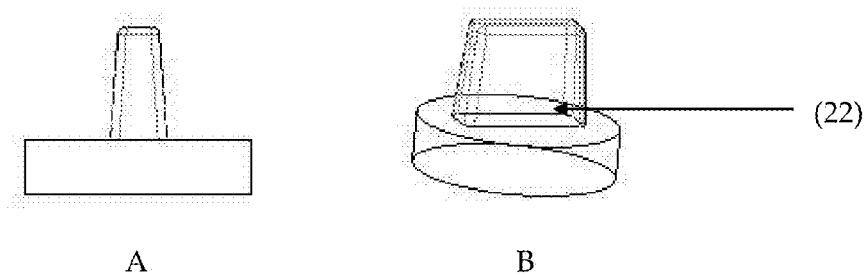

FIG. 15 shows a grip (22) on the rotor, in order to allow for a precise manual motion of the rotor.

Figure 16:
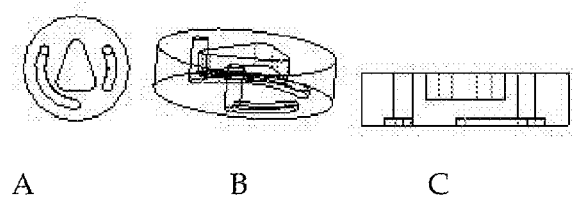

FIG. 16 depicts a disc-shaped embodiment of the rotor which contains structures on the top side as well as on the bottom side. In this embodiment, different levels of a fluidic system can be interconnected in a controlled manner. In this embodiment, the rotor can be realized either out of a single or out of a combination of materials and can be coated completely or partly.

Polymeric materials for example can be utilized for the complete rotor. Especially suited are polymers such as Viton, Teflon, polypropylene, or polyethylene or materials with similar properties. Additional polymers or those mentioned before can be used in combination with a layer which has a sealing contact to the fluidic system. Alternative options are combinations of several materials. For instance, a harder component is capped with the sealing layer. In order to obtain a rotor being both robust and tightly sealing, an embodiment utilizing more than one material can be conveniently realized by injection molding using polymers as material. A well-known technical process to manufacture such structures is a multi-component injection-molding where several components can be molded sequentially in a single process. As a result, no assembly is required for such a rotor.

In order to improve the properties of the valve, it is generally an option to coat the rotor on the sealing side faced to the fluidic system, but also the counterpart to the rotor, the fluidic system, can be coated. The coating can be applied either to both sides or to just one of the sides. In order to change the fluidic behavior of liquids in the system, coatings in question can be used to either improve the sealing properties of the components, their turning properties, or to utilize more hydrophobic or hydrophilic characteristics.

The holding-down device can be designed as a kind of cap which covers the rotor and then is connected firmly to the fluidic system. Alternatively, the holding-down device can be a kind of plate, which is connected to the fluidic system with its full surface.

Both kinds of holding-down device can be supplemented with additional springs or the holding-down device itself can provide an intrinsic tension—for example by a special design of the molded part during injection molding.

Figure 17:
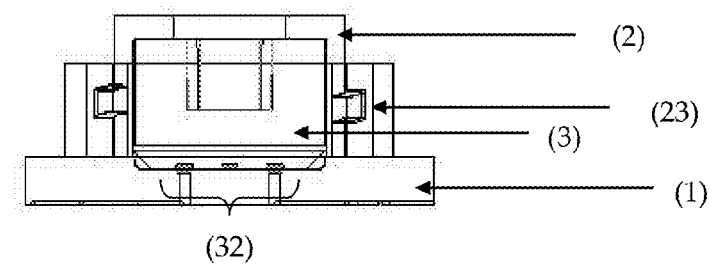

Against this background, FIG. 17 provides a possible embodiment of the holding-down device and the base plate in which the holding-down device is shaped as a cap and both the cap and the base plate bear a screw thread (23). The thread provides a tight junction of cap and mounting plate as well as a sufficient contact pressure for the rotor. In this structure, junctions (28) from the base plate to the counter structures for the bottom side of the rotor are clearly visible which are part of most embodiments of the described invention. As illustrated here as well, these junctions are usually in contact to additional fluidic systems (4) of the base plate.

Figure 18:
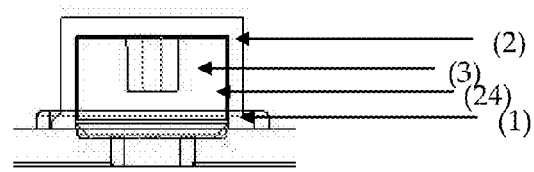

FIG. 18 displays the option of mechanical support structures (24), which can also be used for adhesive bonding or welding.

Figure 19:
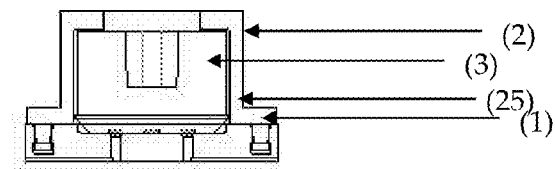

The application of protruding pins (25) for clamping is an additional option for the fixation of the holding-down device on the base plate. As shown in FIG. 19, the protruding pins can also be made from more flexible material.

Figure 20:
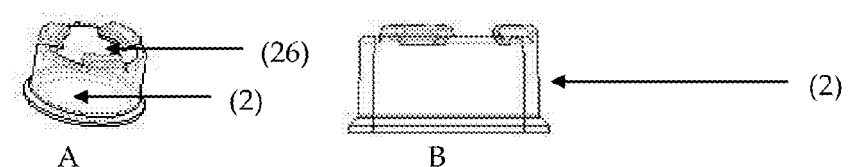
Figure 21:
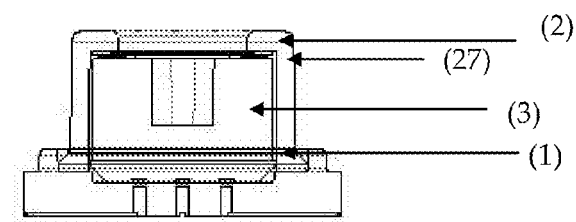

The initial tension, which will be generated by a cap or a second plate, as it is displayed in FIG. 2, can be enhanced by introduction of an integrated spring (26) in the cap shown in FIG. 20 or by a top plate. In order to enhance the initial tension and the seal effect accordingly, an additional spring (27) can be inserted alternatively, as shown in FIG. 21.

Thereby the system can be designed in the following way:
1. The base plate with fluidic structures, on which the rotor and the holding-down device are mounted. In this case, the rotor is placed on the counter structure in the base plate as a seal. An exemplified embodiment is shown in FIG. 1.
2. A system, in which the holding-down device is tightly connected with the base plate via a thread, as described in paragraph 1. This is exemplarily shown in FIG. 17.
3. A system, as described in paragraph 1, in which the holding-down device is tightly clamped, welded, bonded, or connected via a different method to the plate. In this scenario, FIG. 18 provides an embodiment.

4. A system, as described in paragraphs 1-3, in which the plate itself is connected to other fluidic systems, as shown schematically in FIG. 5.
5. A system, as described in paragraphs 1-4, in which the rotor contains cavities with defined volumes being appropriate for the metering of liquids.
6. A system, as described in paragraphs 1-5, in which the rotor consists of a single material.
7. A system, as described in paragraphs 1-6, in which the rotor consists of two different materials, as illustrated in FIG. 8.
8. A system, as described in paragraphs 1-6, in which the rotor consists of both a harder and a softer material. The latter faces the base plate with the fluidic structures and seals the system.
9. A system, as described in paragraphs 1-8, in which the sealing face of the rotor facing the base plate, is additionally coated, in order to influence the behavior of the fluid during the introduction of liquids by e.g. modified hydrophobic/hydrophilic or lipophilic properties.
10. A system, as described in paragraphs 1-8, in which the sealing face of the base plate with the fluidic system facing to the rotor, is additionally coated, in order to influence the behavior of the fluid during the introduction of liquids by e.g. modified hydrophobic/hydrophilic or lipophilic properties.
11. A system, as described in paragraphs 1-8, in which the sealing face of the rotor facing the base plate, as well as the contact area of the base plate are additionally coated, in order to influence the behavior of the fluid during the introduction of liquids by e.g. modified hydrophobic/hydrophilic or lipophilic properties.
12. A system, as described in paragraphs 1-11, in which additional components are introduced into the fluidic structures or in the material of the rotor or in the fluidic system, which will be dissolved during the usage. This could be reagents, which modify the surface, or dried buffer components, antibodies, enzymes, catalysts, or reaction mixtures.
13. A system, as described in paragraphs 1-12, in which the rotor contains a structure, which can be used for the plug in of the counterpart for manual or automatic operation that is to say rotation of the rotor, as schematically shown in FIG. 14.
14. A system, as described in paragraphs 1-13, in which the rotor contains marks that allow for a visual recognition of the position of the rotor on a plate with the fluidic system or on the holding-down device by either the form of the structure for the plug in of the counterpart or additional marks on the rotor. Here, a variant of structures is schematically shown in FIG. 14 A as an indentation on the rotor.
15. A system, as described in paragraphs 1-14, in which a holding-down device expresses a form of coping.
16. A system, as described in paragraphs 1-15, in which the rotor possesses an extension on the far side with respect to the fluidic system, in order to be able to rotate the rotor manually, as shown in FIG. 9.
17. A system, as described in paragraphs 1-16, in which the rotor contains a structure with a counter structure in the cap on the far side with respect to the base plate, in order to reach a defined position of the rotary valve by the usage of a mechanical stop, as exemplarily shown in FIG. 10.
18. A system, as described in paragraphs 1-15, in which the rotor contains a structure facing the base plate, which possesses a counter structure in the base plate that restricts the rotation in a way that a defined position of the rotary valve will be reached by the usage of a mechanical stop. One embodiment is schematically shown in FIG. 11.
19. A system, as described in paragraphs 1-18, in which the holding-down device is formed as a planar structure, as depicted in FIG. 3.
20. A system, as described in paragraphs 1-19 where the holding-down device is a planar element containing fluidic structures, as shown in FIG. 4.
21. A system, as described in paragraphs 1-20, which is assembled out of different planar elements containing several rotors whereby the planar elements act as holding-down devices as shown in FIG. 4.
22. Systems, as described in paragraphs 1-21, in which the holding-down device is supplied by an additional spring, as it is shown in FIG. 21.
23. Systems, as described in paragraphs 1-22, in which the holding-down device contains integrated spring components, as it is shown in FIG. 20.
24. Systems, as described in paragraphs 1-23, in which the rotor contains integrated spring elements.
25. Systems, as described in paragraphs 1-24, which are made from plastics.
26. Systems, as described in paragraphs 1-24, which are made from metal.
27. Systems, as described in paragraphs 1-24, which are made from glass.
28. Systems, as described in paragraphs 1-24, which are made from ceramic.
29. Systems, as described in paragraphs 1-24, which are made from a combination of different materials such as plastics, metal, glass, and ceramic.

As a general rule for the present invention, all processes described for the usage of liquids are synonymously valid for gases and a combination of liquid and gaseous substances is possible as well, for instance the targeted delivery of gases in liquid.

Likewise, the systems do not have to be applied necessarily in the position reported here. It is also possible to turn, for instance, the systems through 90° or 180° and hence they can be utilized in all possible positions.

The invention claimed is:
1. A microfluidic system comprising:
a base plate,
a holding-down device, and
a rotor,
said rotor being located between the holding-down device and the base plate,
said rotor, said holding-down device and said base plate being made of plastic,
said rotor being pressed onto the base plate by the holding-down device, wherein the rotor is formed as a single piece comprising fluidic structures,
wherein the holding-down device is fixed on an upper surface of the base plate by adhesive bonding or welding,
wherein neither the holding-down device nor any mechanical support structures for fixing the holding-down device on the upper surface of the base plate protrude into the base plate,
wherein the base plate possesses openings from one or more channels, which open out into the fluidic structures of the rotor mounted on the base plate, in order to guarantee a directed flow of liquids or gases in different channels, channel systems, cavities, or tubing, to facilitate their coupling or to inhibit any flow of liquids or gases.

2. The system of claim 1, in which the base plate is a fluidic or microfluidic system and the holding-down device is formed like a cap around the rotor and presses the rotor tightly onto a counter structure of the base plate.

3. The system of claim 1, in which the holding-down device is an upper plate and the rotor is mounted between the upper plate and the base plate, which plates press the rotor with sufficiently high initial tensions against a counter structure of at least one of the plates resulting in a microfluidic system with several layers.

4. The system of claim 3, in which the rotor is mounted between the plates, which press the rotor with sufficiently high initial tensions against counter structures of each of the plates resulting in a microfluidic system with several layers and resulting in a rotor with through holes or slits, and, as a consequence, giving rise to a system, where openings from channels of the base plate can be connected with openings from channels of the upper plate via the rotor.

5. The system of claim 3 in which at least one additional structured plate is added resulting in a system with multiple layers, in which at least the rotor and a further rotor are integrated at different locations and positions.

6. The system of claim 1 in which rotation of the rotor is not possible for more than 360° mediated by one or more domes on the upper side of the rotor together with an appropriate counter structure—either in the holding-down device pressing down the rotor—or, alternatively, by one or several domes on the bottom side of the rotor together with a counter structure in the base plate both giving rise to a tight arrestor, which allows for a simple determination of the precise position of the rotor and, as a result, an accurate positioning.

7. The system of claim 1 in which rotation of the rotor is not possible for more than 360° mediated by one or several domes in the holding-down device pressing down the rotor together with an appropriate counter structure in the rotor or, alternatively, by one or more domes on the base plate together with an appropriate counter structure in the rotor both giving rise to a tight arrestor, which allows for a simple determination of the precise position of the rotor and, as a result, an accurate positioning.

8. The system of claim 1 in which the holding-down device is screwed onto the base plate with the help of a thread and, thus, supplies the required contact pressure for the rotor.

9. The system of claim 1 in which the holding-down device is pressed down on the base plate with the help of mechanical support structures on the base plate and/or at the holding-down device and, thus, provides the required contact pressure for the rotor.

10. The system of claim 1 in which the holding-down device is anchored in the base plate with the help of domes.

11. The system of claim 1 in which the holding-down device is a cap or upper plate which possess directly integrated spring elements that can enhance the contact pressure for the rotor.

12. The system of claim 1 in which an additional spring enhancing the contact pressure for the rotor is implemented in the holding-down device.

13. The system of claim 1 in which the holding-down device carries a dome or longer extension, which allows for a manual operation.

14. The system of claim 1 which holds marks on rotor, holding-down device and/or base plate facilitating a simple visual monitoring of the exact position of the rotor and, thus, of the structures located inside the rotor and, thus, of the switching positions of fluidic channels.

15. The system of claim 1 which contains more than one rotor and more than one holding-down device on the base plate or, as the case may be, more than one rotor in a fluidic element with multiple levels.

16. The system of claim 1 which contains liquid and/or solid substances in the structures or the material of the rotor and/or in the structures and/or in the material of the base plate.

17. An application of the system of claim 1 in which the system, in form of a microfluidic system with integrated rotors and holding-down devices, is implemented in an operating device, where the device controls the actuation of the rotor by actuators for rotary valves, in form of positioning motors with a ratchet for the insertion into the rotor, and, if necessary, can adjust and/or read out the accurate positioning of the rotor.

18. The system of claim 1, wherein any mechanical support structures for fixing the holding-down device on the upper surface of the base plate do not protrude through the holding-down device.

19. A microfluidic system comprising:
a base plate,
a holding-down device, and
a rotor
said rotor being located between the holding-down device and the base plate,
said rotor, said holding-down device and said base plate being made of plastic,
said rotor being pressed onto the base plate by the holding-down device, wherein the rotor is formed as a single piece comprising fluidic structures,
wherein the holding-down device is fixed on an upper surface of the base plate by welding,
wherein neither the holding-down device nor any mechanical support structures for fixing the holding down device on the upper surface of the base plate protrude into the base plate,
wherein the base plate possesses openings from one or more channels, which open out into the fluidic structures of the rotor mounted on the base plate, in order to guarantee a directed flow of liquids or gases in different channels, channel systems, cavities, or tubing, to facilitate their coupling or to inhibit any flow of liquids or gases.

20. A microfluidic system comprising:
a base plate,
a holding-down device, and
a rotor
said rotor being located between the holding-down device and the base plate,
said rotor, said holding-down device and said base plate being made of plastic,
said rotor being pressed onto the base plate by the holding-down device, wherein the rotor is formed as a single piece comprising fluidic structures,
wherein the holding-down device is fixed on an upper surface of the base plate by welding,
wherein the holding-down device does not protrude into the base plate,
wherein the base plate possesses openings from one or more channels, which open out into the fluidic structures of the rotor mounted on the base plate, in order to guarantee a directed flow of liquids or gases in different channels, channel systems, cavities, or tubing, to facilitate their coupling or to inhibit any flow of liquids or gases.

\* \* \* \* \*